(No Model.) 11 Sheets—Sheet 1.
H. N. & C. E. FOWLER.
BAKING MACHINE.

No. 444,379. Patented Jan. 6, 1891.

(No Model.) 11 Sheets—Sheet 3.

H. N. & C. E. FOWLER.
BAKING MACHINE.

No. 444,379. Patented Jan. 6, 1891.

WITNESSES:
Chas. A. Mahony
Henry T. Dickey

INVENTORS.
Horace N. Fowler
Charles Edward Fowler
by their attorney
Chas. A. Reitter (No Model.)  11 Sheets—Sheet 4.
H. N. & C. E. FOWLER.
BAKING MACHINE.

No. 444,379. Patented Jan. 6, 1891.

WITNESSES: INVENTORS.

(No Model.)  11 Sheets—Sheet 5.

H. N. & C. E. FOWLER.
BAKING MACHINE.

No. 444,379. Patented Jan. 6, 1891.

WITNESSES:
Chas. A. Mahony
Henry T. Drebert

INVENTORS
Horace W. Fowler
Charles Edward Fowler
by their attorney
Chas. A. Rieter (No Model.)

H. N. & C. E. FOWLER.
BAKING MACHINE.

No. 444,379. Patented Jan. 6, 1891.

WITNESSES:
Chas. A. Mahony
Henry T. Dechert

INVENTORS.
Horace N. Fowler
Charles Edward Fowler
by their attorney
Chas. A. Rutter

(No Model.) 11 Sheets—Sheet 7.

H. N. & C. E. FOWLER.
BAKING MACHINE.

No. 444,379. Patented Jan. 6, 1891.

WITNESSES
Chas. A. Mahony
Henry T. Dechert

INVENTORS.
Horace N. Fowler
Charles Edward Fowler
by their attorney
Chas. A. Rutter (No Model.)　　　　H. N. & C. E. FOWLER.　　11 Sheets—Sheet 8.
BAKING MACHINE.

No. 444,379.　　　　　　　　　Patented Jan. 6, 1891.

Fig. 21.

WITNESSES:　　　　　　　　　　　　　INVENTORS

(No Model.)  11 Sheets—Sheet 9.
H. N. & C. E. FOWLER.
BAKING MACHINE.

No. 444,379. Patented Jan. 6, 1891.

WITNESSES:
Wm. R. Webster.
Chas. A. Mahony

INVENTORS
Horace W. Fowler
Charles Edward Fowler
by their attorney
Chas. A. Rutter.

(No Model.) H. N. & C. E. FOWLER. 11 Sheets—Sheet 11.
BAKING MACHINE.

No. 444,379. Patented Jan. 6, 1891.

UNITED STATES PATENT OFFICE.

HORACE N. FOWLER, OF PHILADELPHIA, PENNSYLVANIA, AND CHARLES EDWARD FOWLER, OF HAMMONTON, NEW JERSEY; SAID CHARLES EDWARD FOWLER ASSIGNOR TO SAID HORACE N. FOWLER.

BAKING-MACHINE.

SPECIFICATION forming part of Letters Patent No. 444,379, dated January 6, 1891.

Application filed April 19, 1889. Serial No. 307,791. (No model.)

*To all whom it may concern:*

Be it known that we, HORACE N. FOWLER and CHARLES EDWARD FOWLER, both citizens of the United States, the former a resident of the city and county of Philadelphia, and State of Pennsylvania, and the latter a resident of Hammonton, in the county of Atlantic and State of New Jersey, have invented certain new and useful Improvements in Baking-Machinery, of which the following is a specification.

Our invention relates in general to improvements in automatic bread and cake baking machinery, and more particularly to improvements in machinery for baking that form of bread known to the trade as "gems," and which consist of flour or meal mixed with pure water, milk, or cream, and which are raised by the sudden conversion into steam of the water in the dough, no yeast, baking-powders, fermentation, carbonic-acid gas, or other drugs or chemicals being used.

While our machine is more particularly adapted for manufacturing gems, it will of course be understood that it may be used for making bread with yeast or baking-powders or for making crackers, cakes, biscuits, &c.

Our machine is entirely automatic, and consists of a hopper in which the dough or batter is placed after being mixed, and from which it is forced by expelling-pistons in suitable quantities to the pans, which are carried by an endless belt through the oven where the cakes are baked, and mechanism for operating the cutters and expelling-pistons for driving the pan-carrying belts for removing the baked bread or cakes from the pans, and for cleaning the pans after the bread or cakes have been removed from them.

In the accompanying drawings, forming part of this specification, and in which similar letters of reference indicate similar parts throughout the several views, Fig. 19 a side elevation, and Fig. 20 a plan, of the mechanism for driving and stopping and starting the endless-chain belts which carry the pans; Fig. 24 is a longitudinal section on line $zz$ of Fig. 22.

Figure 1:
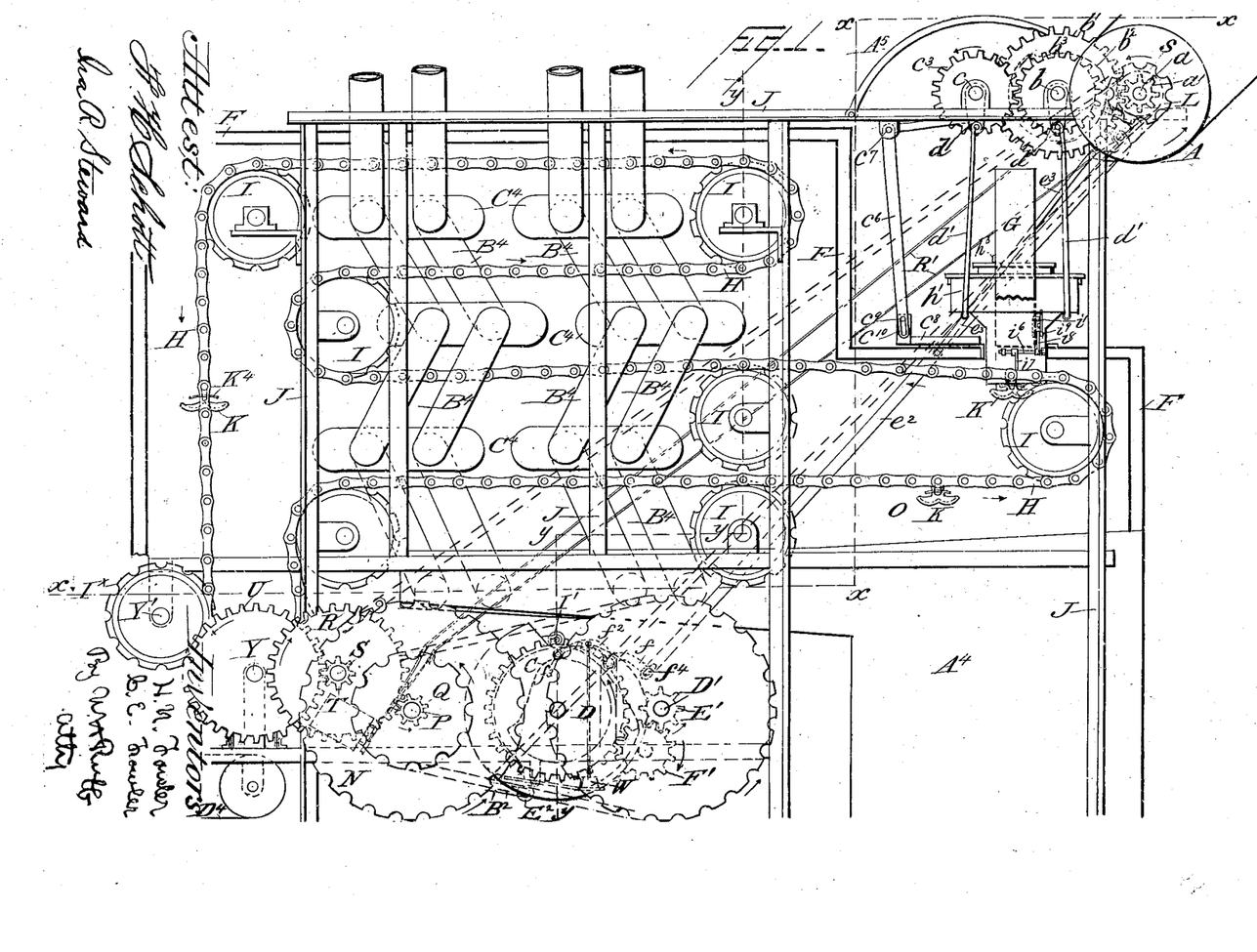
Figure 1 is a side elevation of our baking-machine, the oven-jacket being removed to show the interior.
Figure 6:
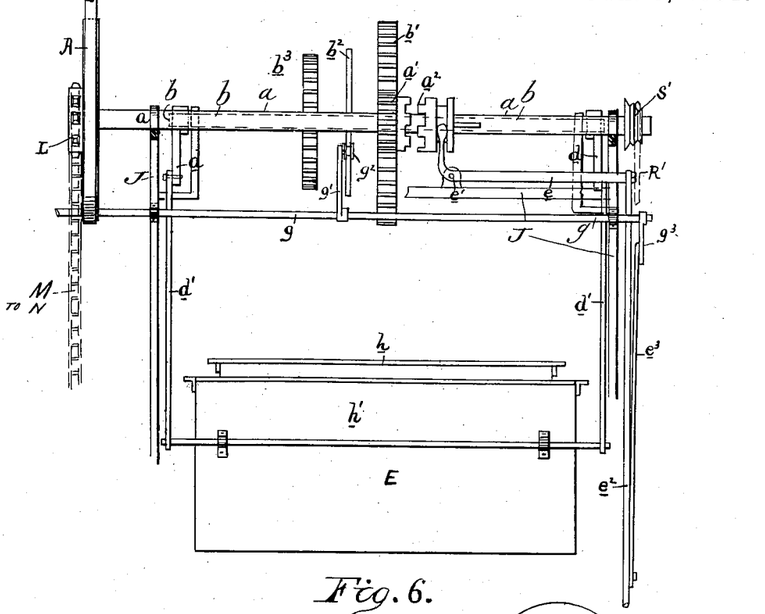
Fig. 6, a front view of the hopper and mechanism for raising and lowering it.

The machine is driven from some convenient source of power, a pulley A on a shaft $a$, Figs. 1 and 6, driving the machine.

Upon the shaft $a$ is a gear-wheel $a'$, which is loose on this shaft.

$a^2$ is a clutch, one part of which is fast to gear $a'$, and the other part of which turns with shaft $a$.

Figures 2, 4, 5:
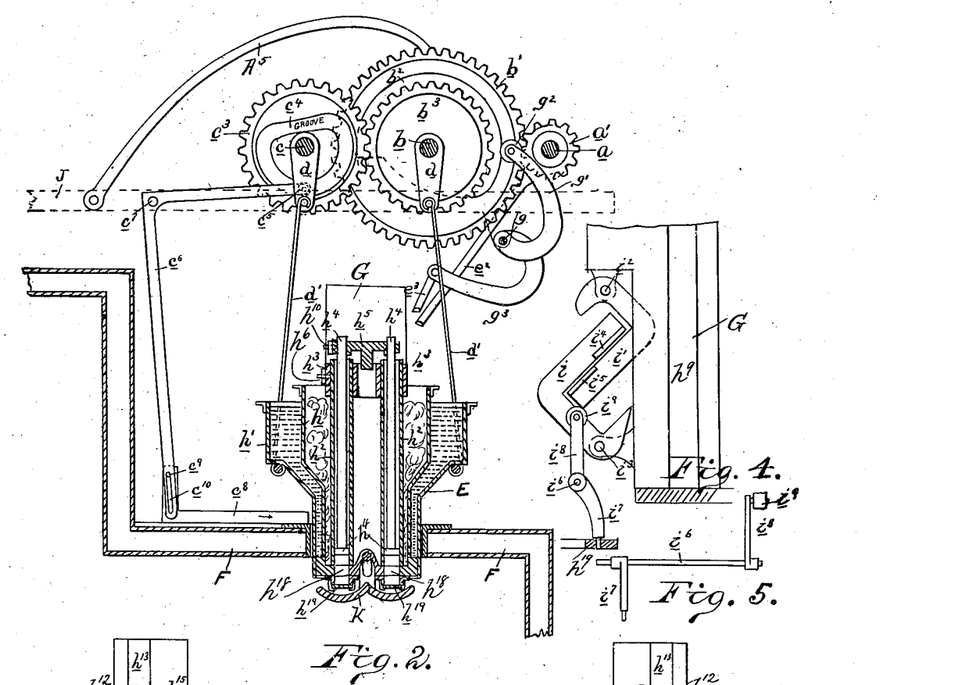
Fig. 2, a sectional side elevation through the hopper and the cutters and expelling-pistons, also showing the mechanism for raising and lowering the hopper and opening and closing the slide which covers the aperture in the oven-jacket, through which the lower end of the hopper passes when the pans are to be filled.
Fig. 4, a front view of mechanism for opening and closing the slide in the bottom of the hopper in order to allow dough to pass from the cutters and expelling-pistons to the baking-pans.
Fig. 5, a side elevation of the levers for operating the cut-off slide in bottom of hopper.

$b'$ is a gear-wheel carried on a shaft $b$, which gears into wheel $a'$, Figs. 1 and 2.

$b^3$ is a gear-wheel on shaft $b$, which gears into a wheel $c^3$ on a shaft $c$. All these shafts are carried by the main frame of the machine or by brackets or bearings carried by the main frame.

Upon both ends of the shafts $b$ and $c$ are placed cranks $d$, Figs. 2 and 6, to which are attached rods $d'$, which are attached at their lower ends to the hopper E.

The clutch $a^2$ is furnished with a shifting lever $e$, pivoted at $e'$ to the main frame. To the end of the lever $e$ a rod $e^2$ is secured, which extends down and is secured to the end of a lever $f$, which is secured to a rod $f'$.

Figure 22:
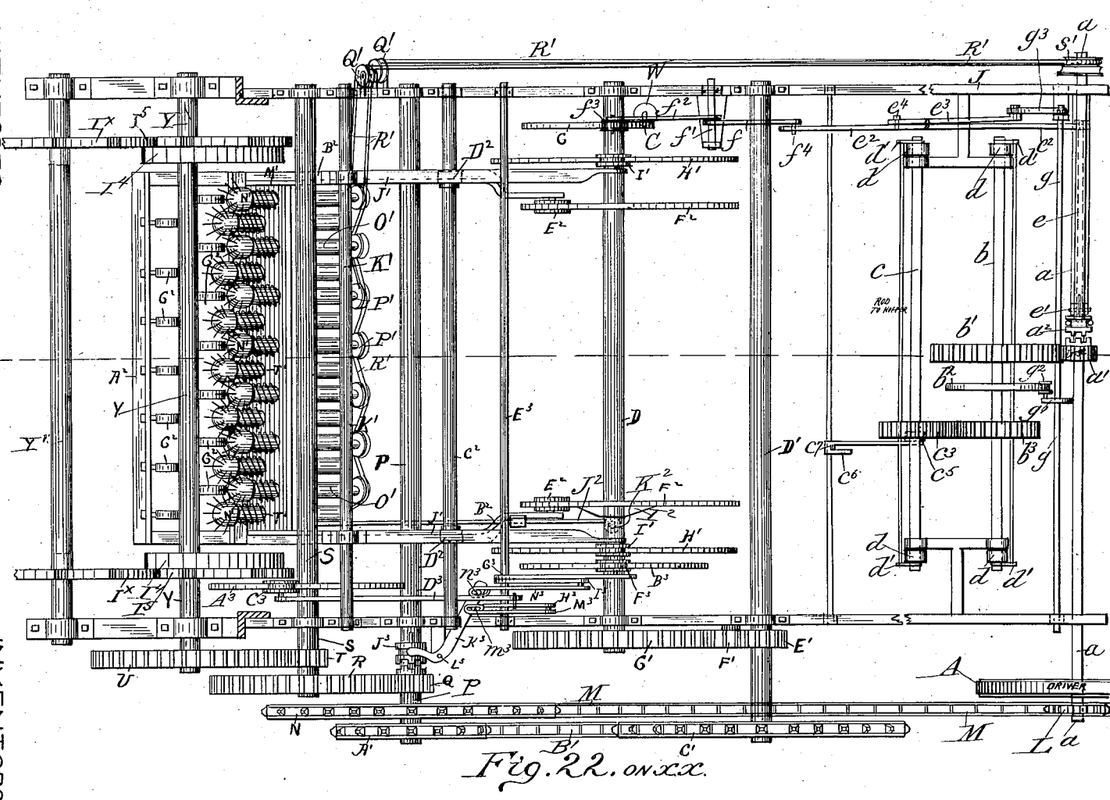
Fig. 22 is a horizontal section of Fig. 1 on the line $xx$, the oven being omitted, showing devices for scraping and brushing the pans and mechanism for actuating these devices.
Figure 23:
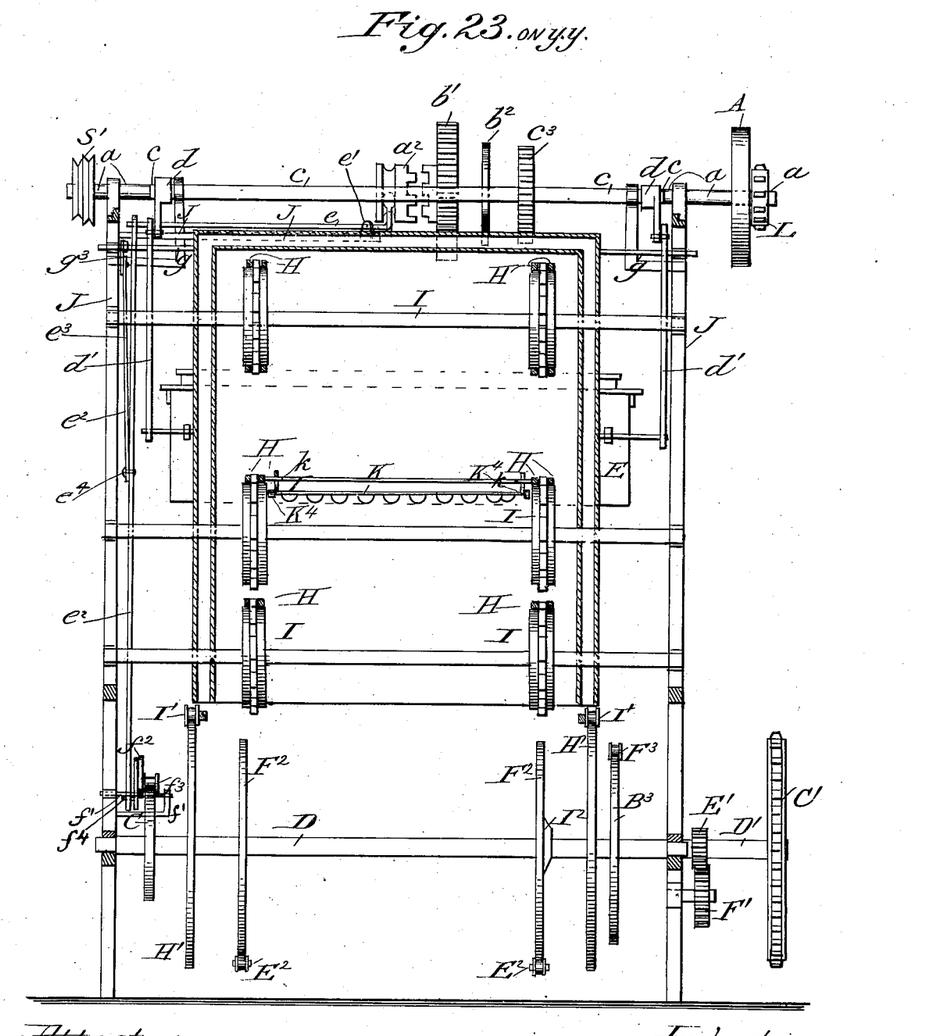
Fig. 23 is a vertical transverse section on the line $yy$ of Fig. 1.

$f^2$ is a lever, also secured to rod $f'$, which is mounted in bearings on the main frame, as shown in Fig. 22, and carrying at its end a roller $f^3$, which rests upon a cam C, which is carried by a shaft D, which is driven as hereinafter described.

Upon the shaft $b$ a cam $b^2$ is placed.

$g$ is a rock-shaft suitably supported in bearings on the main frame.

$g'$ is an arm secured to shaft $g$.

$g^2$ is a roller carried by arm $g'$.

$g^3$ is an arm also secured to rock-shaft $g$.

Figure 7:
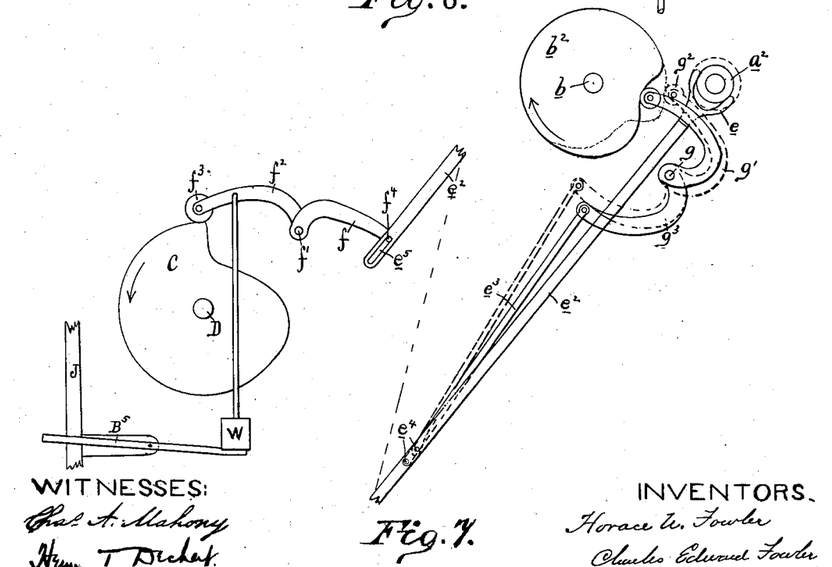
Fig. 7, a side elevation of mechanism for starting and stopping the raising and lowering of the hopper and its connected parts.

$e^3$ is a rod, one end of which is secured to arm $g^3$ and the other end of which is pivoted to rod $e^2$ at $e^4$, Fig. 7.

Figure 3:
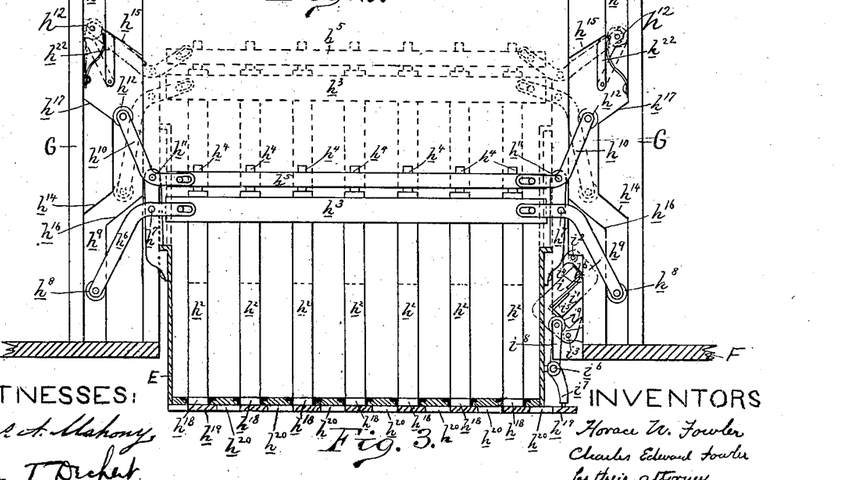
Fig. 3, a front view of the cutters and expelling-pistons for filling the baking-pans and mechanism for operating them, the hopper being shown in section.

The apparatus above described is used for automatically starting and stopping the mechanism connected with the feeding arrangement and operates as follows: The shaft $a$ is driven by a belt on pulley A, and the cam C suitably set on the shaft D, and this shaft D, being driven as hereinafter described, revolves the cam C. If the clutch $a^2$ is out of gear, as shown in Fig. 6, the feeder is not operating; but when the cam C is revolved sufficiently to allow the roller $f^3$ to drop, the weight W, through arms $f^2$ and $f$ and rock-shaft $f'$, raises the rod $e^2$, which throws the clutch into gear, and the feeder starts. Before the feeder has done moving the cam C has again raised weight W, the pin $f^4$ on arm $f$ moving back in slot $e^5$ in rod $e^2$. Before the weight W has been raised the cam $b^2$ has been moved far enough to hold the rod $e^2$ up by pushing back arm $g'$, which raises arm $g^3$, to which is attached rod $e^3$, as shown. The cam $b^2$ holds rod $e^2$ up until roller $g^2$ falls into the notch in this cam, when the rod $e^2$ is released and falls, throwing the feeder out of gear. When the clutch $a^2$ is in gear, the gear-wheel $a'$ is revolved, driving the gear-wheel $b'$ on shaft $b$. $b^3$ is a gear-wheel fast to shaft $b$, and $c^3$ a gear-wheel gearing into and driven by wheel $b^3$. The revolution of wheel $a'$ drives wheel $b'$, which drives shaft $b$, which turns wheel $b^3$, which in turn drives wheel $c^3$, revolving shaft $c$. As the shafts $b$ and $c$ are turned the cranks $d$ on the ends of these shafts are turned, raising by means of rods $d'$ the hopper E, which, when the pans are at rest, passes down through the jacket F of the oven, so that the pans may be filled. The hopper E consists of a box $h$, in which the dough or batter is placed, and a box $h'$, surrounding box $h$, which is filled with ice or cold water in order to keep the dough cool. Within the hopper are placed a number of cutters and expelling-pistons for measuring out and forcing the dough into the baking-pans. The cutters and expelling-pistons for forcing the dough into the pans correspond in number and position to the number of cakes that a pan holds, and consist (see Figs. 2 and 3) of tubes $h^2$, which are carried at their upper ends by a suitable carrying-beam $h^3$. In each tube $h^2$ is placed a piston $h^4$, the upper ends of which are carried by a suitable carrying-beam $h^5$. At each end of the carrying-beam $h^3$ is pivoted one end of a bell-crank lever $h^6$, which is pivoted at $h^7$ to the hopper E or to some suitable bracket secured to the hopper. The outer ends of levers $h^6$ are furnished with rollers $h^8$, which run in grooves $h^9$ in stationary perpendicular guides G, which are carried by the jacket F or the main frame of the machine. At the outer ends of beam $h^5$ are pivoted one end of a bell-crank $h^{10}$, which is pivoted at $h^{11}$ to a bracket on the hopper E. The outer ends of these bell-cranks are furnished with rollers $h^{12}$, which run in grooves $h^{13}$ in the guides G. When the hopper is raised, as already described, the rollers $h^8$ and $h^{12}$ travel until they strike the inclines $h^{14}$ $h^{15}$. When the roller $h^{12}$ strikes incline $h^{15}$, the bell-crank $h^{10}$ is operated so as to raise the pistons $h^4$, and when the roller $h^8$ strikes incline $h^{14}$ the bell-crank $h^6$ raises the tubes $h^2$ clear of the bottom of the hopper and the dough flows in under them. When the hopper starts to descend, the roller $h^8$ first strikes the incline $h^{16}$ and the bell-crank $h^6$ forces the tubes $h^2$ down through the dough, each tube in coming to its seat at the bottom of the hopper cutting through and retaining a certain quantity of dough. A further descent of the hopper causes roller $h^{12}$ to strike incline $h^{17}$, and bell-cranks $h^{10}$ force plungers $h^4$ down, expelling the dough from the tubes $h^2$.

$h^{22}$ are spring-traps for causing rollers $h^{12}$ to take their proper direction during their movements. The dotted lines in Fig. 2 of the drawings show the manner in which the traps work.

The bottom of the hopper is furnished with holes $h^{18}$, through which the dough passes to the pans. A slide $h^{19}$, furnished with holes $h^{20}$, closes the holes $h^{18}$, when the dough is not being forced out of tubes $h^2$. This slide is operated as follows: Secured to the guide G, or to some other stationary part of the machine, are two L-shaped pieces of metal $i$ $i'$, Fig. 4, which are pivoted to guide G at $i^2$ and $i^3$, respectively. The upper end of $i$ is furnished with a flange $i^4$, and the lower end of $i'$ with a flange $i^5$. Secured to the hopper E is a shaft $i^6$, which carries two arms $i^7$ $i^8$, the former being secured to slide $h^{19}$ and the latter being furnished with a roller $i^9$. After the tubes $h^2$ have come to their seat upon the bottom of the hopper during its descent and before the plungers $h^4$ have commenced to operate, the roller $i^9$ on arm $i^8$ strikes in its descent the flange $i^4$ on the metal piece $i$, and the roller $i^9$ is moved in rotating shaft $i^6$, and causing arm $i^7$ to draw slide $h^{19}$ out, so that the holes $h^{20}$ in slide $h^{19}$ shall be directly under the holes $h^{18}$ in the bottom of the hopper. When roller $i^9$ strikes in its descent flange $i^5$ on $i'$, this flange and its carrying-piece swing out, allowing the roller to pass, after which they swing back into position. When hopper E is raised and before tubes $h^2$ leave their seat, the roller $i^9$ strikes flange $i^5$, rotating shaft $i^6$ in the opposite direction, and the arm $i^7$ pushes slide $h^{19}$ over, closing the holes $h^{18}$ in the bottom of the hopper. When the roller strikes flange $i^4$ on its upward movement, it pushes this flange out of its way, and after the roller has passed it the flange is forced back by a spring or falls by gravity into its normal position. A cam-shaped groove $c^4$ is formed in gear-wheel $C^3$, in which a roller $c^5$, Fig. 2, works. This roller is carried by one end of a bell-crank lever $c^6$, which is pivoted at $c^7$ to the main frame, and the lower end of this lever is attached to a slide $c^8$ by a pivot $c^9$. $c^{10}$ is a slot in bell-crank $c^6$, in which pivot $c^9$ can travel. When the hopper E is raised, the revolution of shaft $c$ causes the cam-shaped groove $c^4$ to raise the upper arm of bell-crank $c^6$, throwing in the lower arm of this bell-crank and causing the slide $c^8$ to close the aperture in the jacket F, through which the hopper passes, so that no heat will be lost when the hopper is raised.

H, Fig. 1, is an endless-chain belt passing to and fro through the oven O, and which is supported and guided by pulleys I, carried by the main frame J of the machine. It will be understood that there is a chain belt upon each side of the machine. These chain belts carry the baking-pans K and are driven as follows:

Upon the shaft $a$ is a sprocket-wheel L, Figs. 1 and 6, around which a chain belt M (shown by dotted lines in Fig. 1) passes.

N is a sprocket-wheel on a shaft P, around which the chain M also passes.

Q is a gear-wheel on shaft P.

R is a gear-wheel on a shaft S, and which gears into wheel Q.

T is a gear-wheel on shaft S, gearing into a gear-wheel U on a shaft Y, which also carries pulleys $I^5$, which actuate chain belts H. A revolution of sprocket L drives chain M, which, through wheels N, Q, R, T, U, and $I^5$, drives the chain belts H H.

Secured to shaft P, which carries sprocket-wheel N, is a sprocket-wheel A', which by means of chain belt B' drives a sprocket-wheel C', placed on shaft D'.

E' is a gear-wheel on shaft D', which gears into an idler F', which gears into a gear-wheel G' on shaft D. The purpose of idler F' is simply to change the direction of revolution of gear-wheel G', as indicated in Fig. 1. Upon this shaft D is placed the cam C, which operates clutch $a^2$ on shaft $a$, and also the cams for operating the mechanism for scraping and cleaning the baking-pans.

Figure 8:
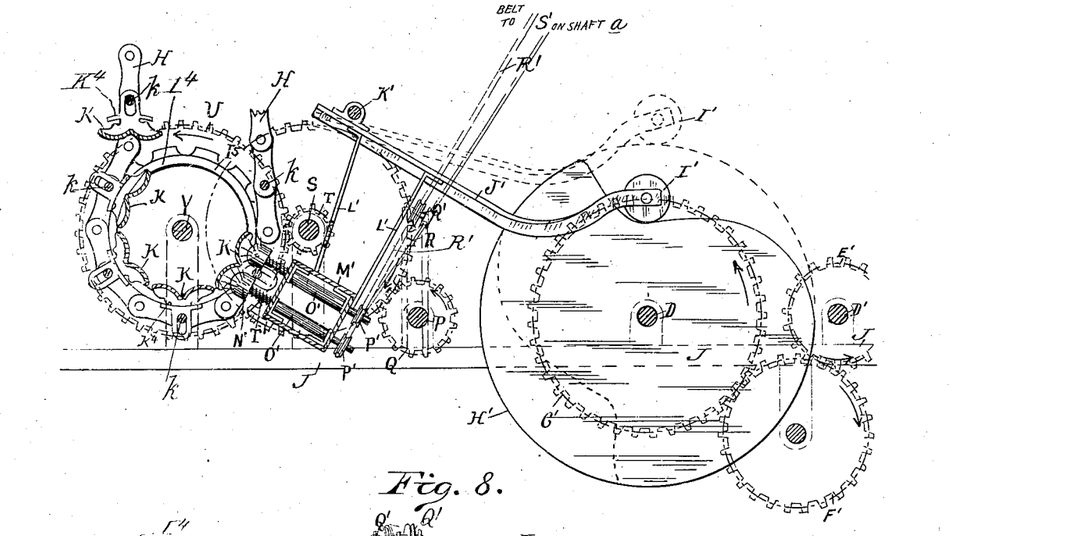
Fig. 8 a side elevation, and Fig. 9 a plan, of mechanism for cleaning the pans.
Figure 9:
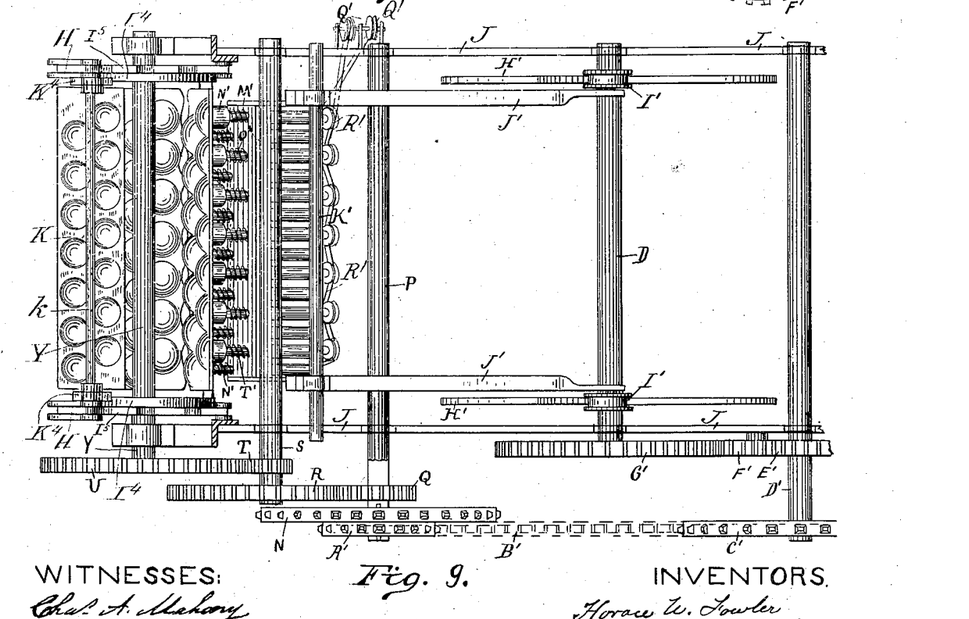
Figure 10:
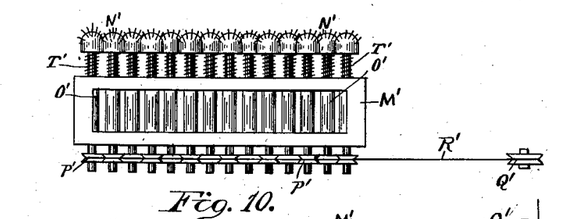
Fig. 10, a plan of the brushes for cleaning pans and frame for carrying them.
Figure 11:
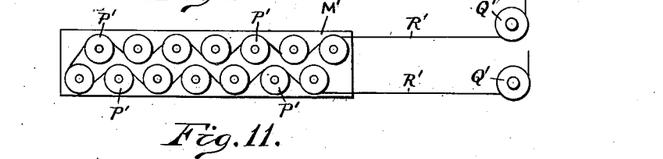
Fig. 11, an end view of Fig. 10.

In Figs. 8 and 9 the mechanism for cleaning the pans is shown. Upon the shaft D are placed two cams H', upon which run rollers I', which are carried upon the ends of arms J', which are pivoted upon a rod K', which extends across the machine, and which is carried by the main frame. To the arms J' is secured by rods L' a frame M', Figs. 8, 9, 10, and 11, which carries a number of brushes N', corresponding in number and position to the number of cups in a pan. The brushes N' are carried upon spindles O', which extend through the frame M', and are furnished with pulleys P', around which passes a belt R', which also passes over (or under) guiding-pulleys Q', carried by the main frame. The belt R' extends up and over and is driven by a pulley S' on the shaft $a$, Fig. 6. While the pans K are being filled with dough from the hopper, the cams H', Figs. 8 and 9, take such a position as to throw the brushes into the empty pans, as shown in Fig. 8, and the rapidly-revolving brushes N' thoroughly clean the pans. Springs T', one end of which bear against brushes N' and the other against frame M', give a certain amount of elasticity to the brushes and cause each brush to clean out its own cup in the pan thoroughly. When cams H' lift rollers I' the brushes are thrown out of the pans.

Figures 12, 13:
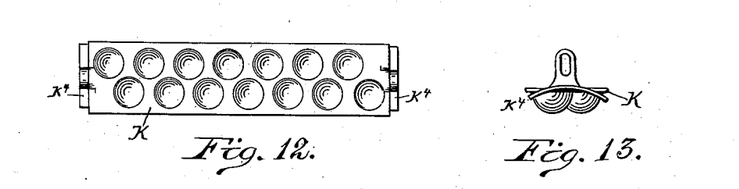
Fig. 12, a plan of a pan.
Fig. 13, an end elevation of Fig. 12.
Figure 14:
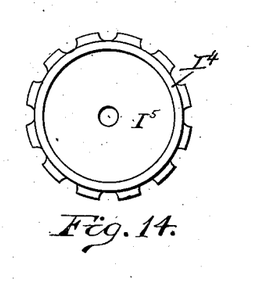
Fig. 14 a side, and Fig. 15 a front, elevation of one of the endless chain belt pulleys.
Figure 15:
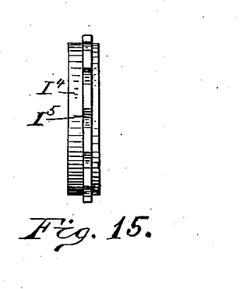

A detail of the pans K is shown in Figs. 12 and 13, and a front and side elevation of the pulleys $I^5$ in Figs. 14 and 15. The pans are hung on pivot-rods $k$, connecting the two chains, and swing on them so as to remain upright while passing around pulleys I.

Y' is a transverse shaft journaled in the main frame, and carries two pulleys $I^x$ $I^x$, which are for the purpose of tightening and directing the chain belts H H to the pulleys $I^5$ $I^5$.

Figure 17:
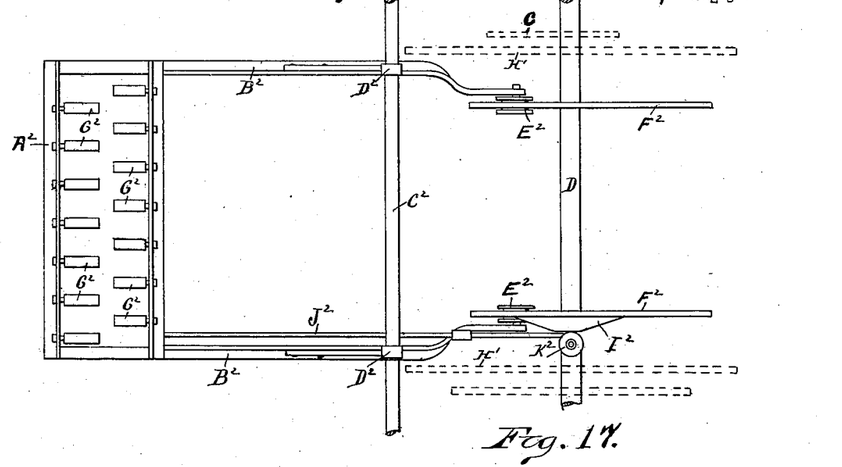
Figure 18:
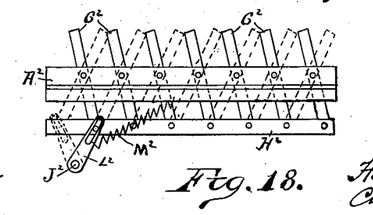
Fig. 18, an end elevation of the scraping-knives, showing their arrangement and movement.

In ordinary cases the baked bread or cakes will fall out of the pans when the pans are inverted by passing over wheels $I^5$ on shaft Y. (The inverting of the pans is caused by arms $K^4$ on pans K, engaging with a rim $I^4$ on the driving-pulleys $I^5$.) In case the bread or cakes should stick to the pans we have provided the apparatus shown in Figs. 16, 17, and 18 for taking them out. $A^2$ is a frame carried upon arms $B^2$, which are hung to a rod $C^2$, (which is carried by the main frame,) by the arms $D^2$. $E^2$ are rollers on the ends of arms $B^2$, which engage with cams $F^2$ on shaft D. While the feeding is taking place and while the brushes are cleaning one set of pans the cams $F^2$ have raised the frame $A^2$, and the curved knives or scrapers $G^2$ are raised into position to operate. The knives $G^2$ are pivoted to the frame $A^2$, and their lower ends are connected together by bars $H^2$. Upon one of the cams $F^2$ is a cam $I^2$. $J^2$ is a rod supported in suitable bearings, one end of which is turned up and furnished with a roller $K^2$, which engages with cam $I^2$, and the other end of which carries two arms $L^2$, which are pivotally connected with the bars $H^2$. As the cam $F^2$ revolves, the cam $I^2$ engages pulley $K^2$, pushing this pulley out, and through $J^2$ and arms $L^2$ reciprocates the knives or scrapers $G^2$, which enter the cups on the pans and scrape any of the cakes out of them which have not fallen out before. $M^2$, Fig. 18, is a spring secured to arms $L^2$, and frame $A^2$ for returning the knives or scrapers to their first position. A further revolution of cams $F^2$ allows the knives to fall away from the pans.

Figures 19, 20:
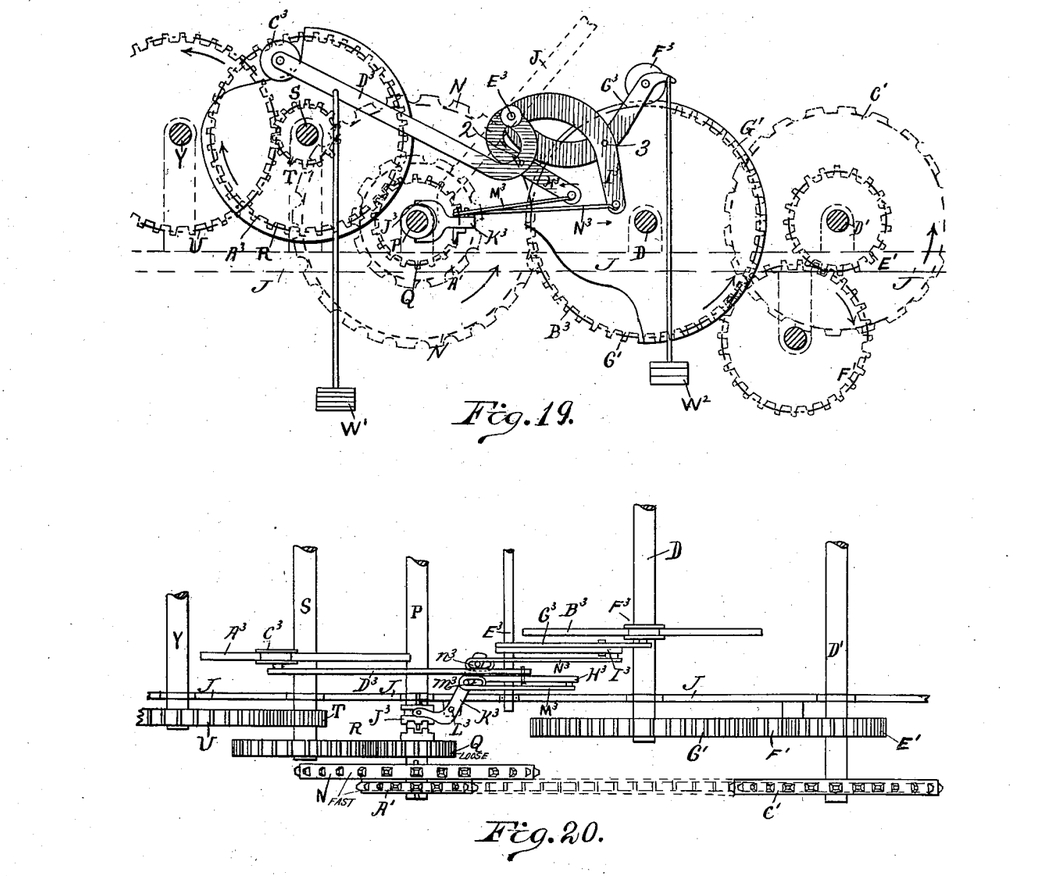

In Figs. 19 and 20 are shown the arrangement for starting and stopping the driving of the chain belt H, which carries the baking-pans K. Upon the shaft S is placed a cam $A^3$, and upon the shaft D is placed a cam $B^3$. Upon cam $A^3$ a roller $C^3$, which is carried by an arm $D^3$, which is pivoted on a stationary shaft $E^3$, travels, and upon the cam $B^3$ a roller $F^3$, carried by an arm $G^3$, also pivoted on shaft $E^3$, travels. Attached to arm $D^3$ by a pivot 2 is an arm $H^3$, and attached to arm $G^3$ by a pivot 3 is an arm $I^3$. Upon the shaft P is a clutch $J^3$, and the sprockets A' N are fast and the gear-wheel Q is loose on this shaft. $K^3$ is the clutch-operating lever, which is pivoted to the main frame or to a bracket at $L^3$. $M^3$ is a rod connecting arm $H^3$ with lever $K^3$, and $N^3$ is a rod connecting arm $I^3$ with lever $K^3$. W' and $W^2$ are weights to cause the arms $D^3$ $G^3$, carrying rollers, to fall promptly on the cams $A^3$ $B^3$. The cam $B^3$ operates through roller $F^3$, arms $G^3$ $I^3$, and rod $N^3$ to throw the clutch $J^3$ into gear and to start the driving of belt H, and the cam $A^3$ operates through roller $C^3$, arms $D^3$ $H^3$, and rod $M^3$ to throw the clutch out of gear and stop the driving-belt. The thrust-rods $M^3$ $N^3$ are provided with slots $m^3$ $n^3$, which allow a certain movement of levers $G^3$ $I^3$ before the clutch is thrown into or out of gear. In the drawings the clutch $J^3$ is shown out of gear, and the several operations of filling the pans and scraping and brushing them are now taking place. As soon, however, as the cam $B^3$ turns far enough to allow roller $F^3$ to fall, the clutch $J^3$ will be thrown into gear, and the driving of chain H will commence and continue until roller $C^3$ falls, when the clutch will be again thrown out of gear.

Figure 16:
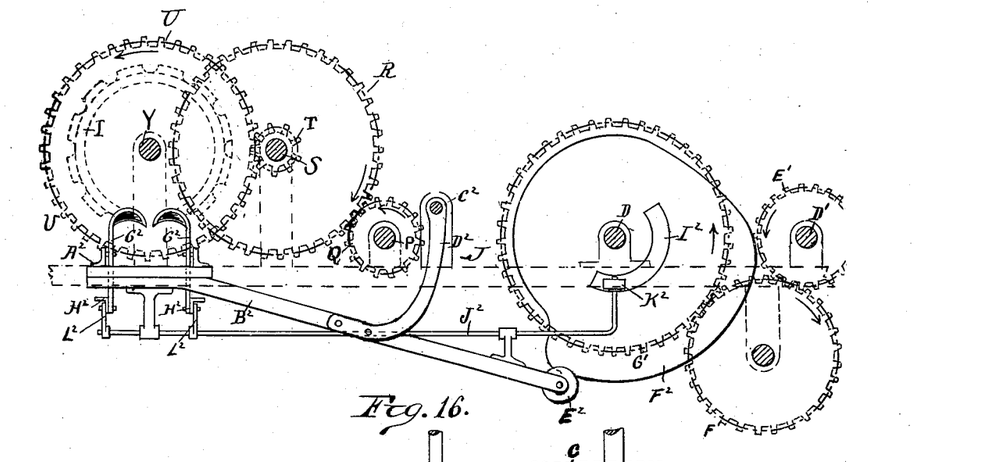
Fig. 16, a side elevation with shafts in section, and Fig. 17 a plan of mechanism for removing the bread from the pans and for scraping said pans.

The direction of revolution of the several gear-wheels, pulleys, &c., are shown in the drawings by the arrows, and in Figs. 8, 16, and 19 the pitch-circles of the gearing is shown by broken lines.

Figure 21:
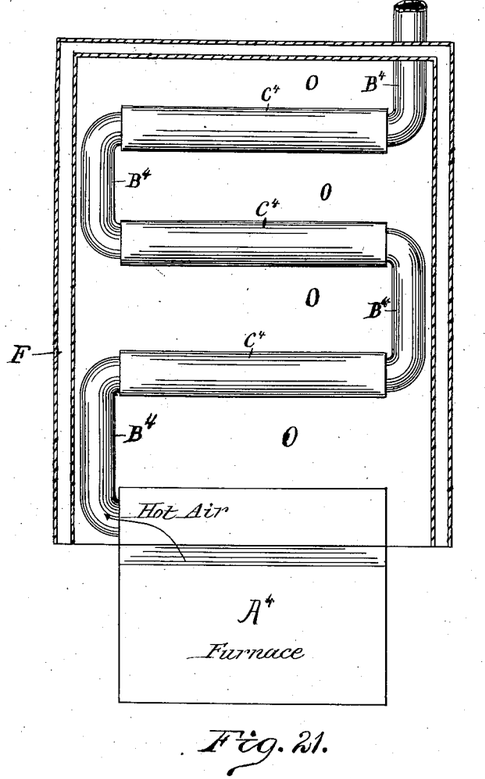
Fig. 21 is an end view of the oven, the jacket being shown in section.

The oven is incased by a double jacket F, Figs. 1, 2, and 21.

$A^4$ is the furnace, which may be of any suitable description, and the heat and products of combustion from the same pass through pipes $B^4$ and drums $C^4$, Figs. 1 and 21, which pass to and fro through the oven O, and from these pipes to the chimney, which is not shown. The heat in passing through pipes $B^4$ and drums $C^4$ is radiated in the oven O and thoroughly heats the oven, while no smoke or gas can reach it. The pans K are very hot when the dough is forced into them, and the sudden conversion into steam of the moisture in the dough raises the dough and makes the articles to be baked light without the aid of yeast, baking-powders, &c.

The operation of our device is entirely automatic, and after dough is placed in hopper E the machine needs no attention. An endless belt $D^4$, Fig. 1, which may be driven in a great number of ways, may be used, if desired, to convey the baked product away from the machine. In order to prevent reversal of the geared mechanism, we place a pawl $A^5$, Fig. 2, so that it will engage with gear b' and prevent any backward movement. (See Fig. 2.)

The operation of the machine, which is entirely automatic, is as follows: The closing of clutch $a^2$ by the mechanism hereinbefore described sets in motion the train of gears which raises and lowers the hopper E by means of rods d' and cranks d. The raising of the hopper raises the pistons within the cutters, and the cutters are raised immediately after the pistons, allowing the dough to flow beneath them. Upon the descent of the hopper the cutters are forced down through the dough, cutting off sufficient portions of it to make the cakes. Then the pistons force the dough out through the bottom of hopper into the baking-pans, which are at rest under the hopper and attached to the chain belt H. The dough is forced from hopper through apertures in its bottom which register with apertures in the slide which closes the bottom of hopper. The slide pistons and cutters are operated by means of the grooved guides G and mechanism before described. When the hopper is raised out of the oven, the opening is closed by the slide $c^8$, as hereinbefore described. When the pans are filled, motion is given to the chain belt H by means of the clutch $J^3$ and its mechanism, and the pans are carried to and fro through the oven to the last pulley $I^5$ on shaft Y, where they are inverted and stopped by clutch $J^3$ moving out of gear and stopping the belt at a point just above the scrapers $G^2$. The scrapers are next raised by mechanism already described and moved through the pans sidewise, scraping the cakes from them, the cakes falling upon a suitable conveyer-belt $D^4$, which removes them. The emptied pans cleaned by the brushes N', which are brought into contact with them and revolved by the mechanism described. While the pans are being scraped and cleaned a new set of pans is being filled from the hopper and the above-described operation repeats itself.

The automatic feeding of the machine may be stopped at any time by raising the weight W, Fig. 7, which is connected by a rod to arm $f^2$, which carries the roller $f^3$. A lever $B^5$ is pivoted to a bracket extending from the main frame, as shown. When one end of this lever is placed under the weight W, by depressing the free end of said lever the weight, with the arm $f^2$ and roller $f^3$ will be raised out of contact with the cam C, thereby stopping the mechanism which produces the automatic feeding of the machine.

Having thus described our invention, we claim—

1. The combination, with a hopper provided with dough and dough-cooling chambers, cutters, and expelling-pistons, of mechanism, substantially as described, for reciprocating said hopper, for the purposes set forth.

2. The combination, with a movable hopper provided with dough and dough-cooling chambers, cutters, and expelling-pistons, of a slide adapted to close the aperture in the oven-jacket, lever connected to slide, and a wheel provided with a cam-groove for operating the lever and reciprocating the slide, for the purpose described.

3. The combination, with a hopper provided with a dough and dough-cooling chamber, cutters, and expelling-pistons and slide, of guides having grooves and inclines, levers pivoted to hopper and to cutter, and piston-carrying beams, said levers, grooves, and inclines being adapted to operate said cutters and pistons, for the purposes set forth.

4. The combination, with a hopper, of a slide provided with openings adapted to register with openings in the bottom of said hopper, a rock-shaft secured to the hopper, arms secured to rock-shaft and to slide, and L-shaped pieces pivoted to the hopper-guide and provided with flanges for the purpose of oscillating the arms and rock-shaft, and thereby reciprocating the slide, for the purpose described.

5. The combination of a driving-shaft, a clutch and loose gear on said shaft, a pivoted clutch-lever, a rod $e^2$, connecting said lever with an arm $f$, and having a slot at its lower end for the reception of a pin on said arm, arms $f f^2$, secured to a rock-shaft arm $f^2$, carrying a suspended weight, and a roller adapted to ride on a cam C, cam C for rocking arms $f f^2$, a cam $b^2$, arms $g' g^3$, secured to a rock-shaft arm $g'$, having a roller adapted to ride on cam $b^2$, a connecting-rod $e^3$, secured to arm $g^3$, and rod $e^2$ for the purpose of holding up said rod, the whole arranged and operating to lock and unlock the clutch on driving-shaft, and thereby start and stop automatically the mechanism for moving the hopper, substantially as shown and described.

6. The combination, with curved knives or scrapers, a movable frame to which said knives are pivotally secured, swinging arms pivoted to main frame and provided with rollers, and cams for swinging the arms and moving the knife-frame into and out of contact with the pans, of a rock-shaft, links connecting one end of said shaft with reciprocating bars attached to the knives, a roller on the opposite end of said shaft, a cam for rocking the shaft, and thereby oscillating the bars and knives, and a spring for returning the knives to their first position, all arranged to scrape the pans and remove the cakes, substantially as shown and described.

7. The combination of revolving brushes elastically mounted in a movable frame, the movable frame, rods connecting the frame to a rocking arm, the rocking arm provided with a roller, and a cam for rocking the arm, and thereby throwing the brushes into and out of contact with the pans, pulleys on the spindles of brushes, and a belt for driving them, whereby the brushes are revolved to clean the pans, substantially as described.

8. In a baking-machine, the combination, with a pan-carrying belt, of a baking-pan provided with curved arms on its ends, adapted to strike and engage with annular rims on driving-pulleys, and the driving-pulleys for inverting the pans, substantially as described.

9. The herein-described mechanism for throwing the clutch into and out of gear so as to start or stop the driving and pan-carrying belt, consisting of cam $A^3$, arms $D^3 H^3$, pivotally secured to shaft $E^3$ and to each other, arm $D^3$, having at its end a roller to ride on cam $A^3$, a rod connecting arm $H^3$ with the clutch-lever, arms $G^3 I^3$, pivotally secured to shaft $E^3$ and to each other, a rod connecting arm $I^3$ with clutch-lever, an arm $G^3$, having at its end a roller, a cam $B^3$ for rocking the arms $G^3 I^3$, the clutch-lever, the clutch loose gear Q on clutch-shaft gears R T, and gear U on belt-driving shaft, substantially as shown and described.

10. A baking-pan consisting of a plate provided with depressions or cups for holding dough, and having on its ends upright slotted arms adapted to be hung to a carrying-belt, and curved arms adapted to engage with rims on pulleys for inverting the pans, substantially as described.

11. In a baking-machine, the combination, with a hopper provided with dough and dough-cooling chambers and gearing for intermittently reciprocating said hopper, of cutters and pistons, guides and levers for operating said cutters and pistons, a slide, rock-shaft, arms and levers for reciprocating said slide, an oven, a slide for automatically closing the hopper opening in the oven, an intermittently-moving belt, and pans connected to said belt, for the purposes set forth.

12. The combination, with a movable hopper and an oven, of a slide adapted to automatically close and open the aperture in the oven-jacket upon the entrance and withdrawal of the hopper, substantially as described.

13. The combination, in a baking-machine, with a hopper provided with dough and dough-cooling chambers, cutters, and expelling-pistons, of guides and levers connected to the hopper and to said cutters and pistons, said levers and guides being adapted to operate the cutters and pistons, for the purposes set forth.

14. A movable hopper provided with dough and dough-cooling chambers, a reciprocating slide provided with apertures adapted to register with the open ends of the expelling-tubes, a rock-shaft having an arm connecting it with said slide, and an arm provided with a friction-roller adapted to be operated by swinging levers, and the swinging levers, in combination.

15. The combination, with baking-pans, of knives or scrapers, swinging arms, rock-shaft, and cams for intermittently moving said scrapers into and out of contact with said pans and oscillating them across the bottoms of said pans, for the purpose set forth.

16. In combination, an intermittently-reciprocating hopper provided with dough and dough-cooling chambers, connecting-rods $d'$, secured to said hopper and to cranks $d$, cranks $d$, gear-wheels $c^3\ b^3\ b'\ a'$, and an automatically-operated clutch $a^2$ for intermittently setting in motion said gearing, whereby said hopper is reciprocated, substantially as shown and described.

HORACE N. FOWLER.
CHARLES EDWARD FOWLER.

Witnesses:
WILLIAM R. WEBSTER,
FRANK L. MOISTER.